United States Patent
Pradines et al.

(10) Patent No.: US 10,806,136 B2
(45) Date of Patent: Oct. 20, 2020

(54) PESTICIDE STRIP ASSEMBLY

(71) Applicants: Paul Pradines, Loxahatchee, FL (US); Melissa Pradines, Loxahatchee, FL (US)

(72) Inventors: Paul Pradines, Loxahatchee, FL (US); Melissa Pradines, Loxahatchee, FL (US)

( * ) Notice: Subject to any disclaimer, the term of this patent is extended or adjusted under 35 U.S.C. 154(b) by 361 days.

(21) Appl. No.: 15/703,406

(22) Filed: Sep. 13, 2017

(65) Prior Publication Data
US 2019/0075782 A1 Mar. 14, 2019

(51) Int. Cl.
*A01M 25/00* (2006.01)
*A01M 1/24* (2006.01)
*A01M 1/20* (2006.01)

(52) U.S. Cl.
CPC ............. *A01M 25/00* (2013.01); *A01M 1/20* (2013.01); *A01M 1/2005* (2013.01); *A01M 1/245* (2013.01)

(58) Field of Classification Search
CPC .. A01M 25/00; A01M 25/002; A01M 1/2005; A01M 1/2011; A01M 1/24; A01M 1/245; A01M 1/20
See application file for complete search history.

(56) References Cited

U.S. PATENT DOCUMENTS

| | | | |
|---|---|---|---|
| 2,157,449 A * | 5/1939 | Berg | A01M 1/145 43/131 |
| 2,911,756 A * | 11/1959 | Geary | A01M 1/02 43/114 |
| 3,653,145 A * | 4/1972 | Stout | A01M 1/04 43/131 |
| 3,704,539 A * | 12/1972 | Alvarez | A01M 1/2011 43/131 |
| 3,767,785 A * | 10/1973 | Bordenca | A01N 33/08 424/416 |
| 4,690,775 A * | 9/1987 | Schott | B01J 13/0065 516/108 |
| 4,862,638 A | 9/1989 | Stevenson | |
| 4,927,635 A * | 5/1990 | Loschiavo | A01M 1/02 424/405 |
| 5,018,299 A * | 5/1991 | Peek | A01M 1/02 43/107 |
| 5,046,280 A * | 9/1991 | Foster | A01M 1/02 43/131 |
| 5,071,704 A * | 12/1991 | Fischel-Ghodsian | A01M 1/2055 261/DIG. 88 |
| 5,154,018 A * | 10/1992 | Livingston | A01M 17/002 43/125 |

(Continued)

FOREIGN PATENT DOCUMENTS

WO WO9726868 7/1997
WO WO-2016108501 A1 * 7/2016 ............. A01M 1/00

*Primary Examiner* — Kathleen I Alker

(57) ABSTRACT

A pesticide strip assembly for easy application and monitoring levels of pesticide including a flexible panel, an adhesive layer and an insecticide impregnated gel. The flexible panel is elongated and has a top side, a bottom side, a first lateral edge and a second lateral edge. The adhesive layer is attached to the bottom side of the flexible panel. The adhesive layer comprises a pressure sensitive adhesive that is positioned on a flexible strip. The adhesive layer is covering and is adhesively secured to the bottom side of the flexible panel. The gel is infused with an insecticide and is positioned on the flexible panel.

1 Claim, 3 Drawing Sheets

(56) References Cited

U.S. PATENT DOCUMENTS

| | | | | |
|---|---|---|---|---|
| 5,238,681 A * | 8/1993 | Chang | | A01N 25/006 424/405 |
| 5,395,047 A * | 3/1995 | Pendergrass, Jr. | | A61L 9/12 239/34 |
| 5,484,600 A | 1/1996 | Sjogren | | |
| 5,660,330 A * | 8/1997 | Scott | | A01M 1/06 239/305 |
| 5,775,026 A * | 7/1998 | Pearce | | A01M 1/2016 43/124 |
| 5,979,108 A * | 11/1999 | Adams | | A01M 1/2005 43/121 |
| 5,987,810 A * | 11/1999 | Nash | | A01M 1/2005 43/107 |
| 6,004,572 A | 12/1999 | Harvan et al. | | |
| 6,309,986 B1 * | 10/2001 | Flashinski | | A01N 25/18 392/386 |
| 6,325,304 B1 * | 12/2001 | Brite | | A01M 7/0046 239/333 |
| 6,668,483 B1 | 12/2003 | Trivisani et al. | | |
| 6,715,231 B2 | 4/2004 | Renzi | | |
| 6,824,850 B2 * | 11/2004 | Nourigat | | A01M 1/04 428/114 |
| 7,059,081 B2 | 6/2006 | Nourigat | | |
| 8,215,051 B2 * | 7/2012 | Alexander | | A01G 13/0281 43/132.1 |
| 8,911,756 B2 * | 12/2014 | Beitzel | | A01N 25/34 424/405 |
| 9,089,121 B2 * | 7/2015 | Diclaro, II | | A01M 1/04 |
| D741,406 S | 10/2015 | Doucette | | |
| 9,901,088 B2 * | 2/2018 | Backmark | | A01M 1/2011 |
| 2003/0024151 A1 * | 2/2003 | Kremer | | A01M 3/022 43/136 |
| 2006/0130392 A1 * | 6/2006 | Harrington | | A01M 1/14 43/132.1 |
| 2010/0043275 A1 * | 2/2010 | Battick | | A01M 1/14 43/114 |
| 2013/0295153 A1 * | 11/2013 | Miresmailli | | A01N 25/18 424/409 |
| 2014/0041285 A1 * | 2/2014 | Russell | | A01K 13/006 43/132.1 |
| 2016/0242403 A1 * | 8/2016 | Gaugler | | A01M 1/20 |

\* cited by examiner

PESTICIDE STRIP ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to pesticides and more particularly pertains to a new pesticide strip for easy application and monitoring levels of pesticide.

BRIEF SUMMARY OF THE INVENTION

An embodiment of the disclosure meets the needs presented above by generally comprising a flexible panel, an adhesive layer and an insecticide impregnated gel. The flexible panel is elongated and has a top side, a bottom side, a first lateral edge and a second lateral edge. The adhesive layer is attached to the bottom side of the flexible panel. The adhesive layer comprises a pressure sensitive adhesive that is positioned on a flexible strip. The adhesive layer is covering and is adhesively secured to the bottom side of the flexible panel. The gel is infused with an insecticide and is positioned on the flexible panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
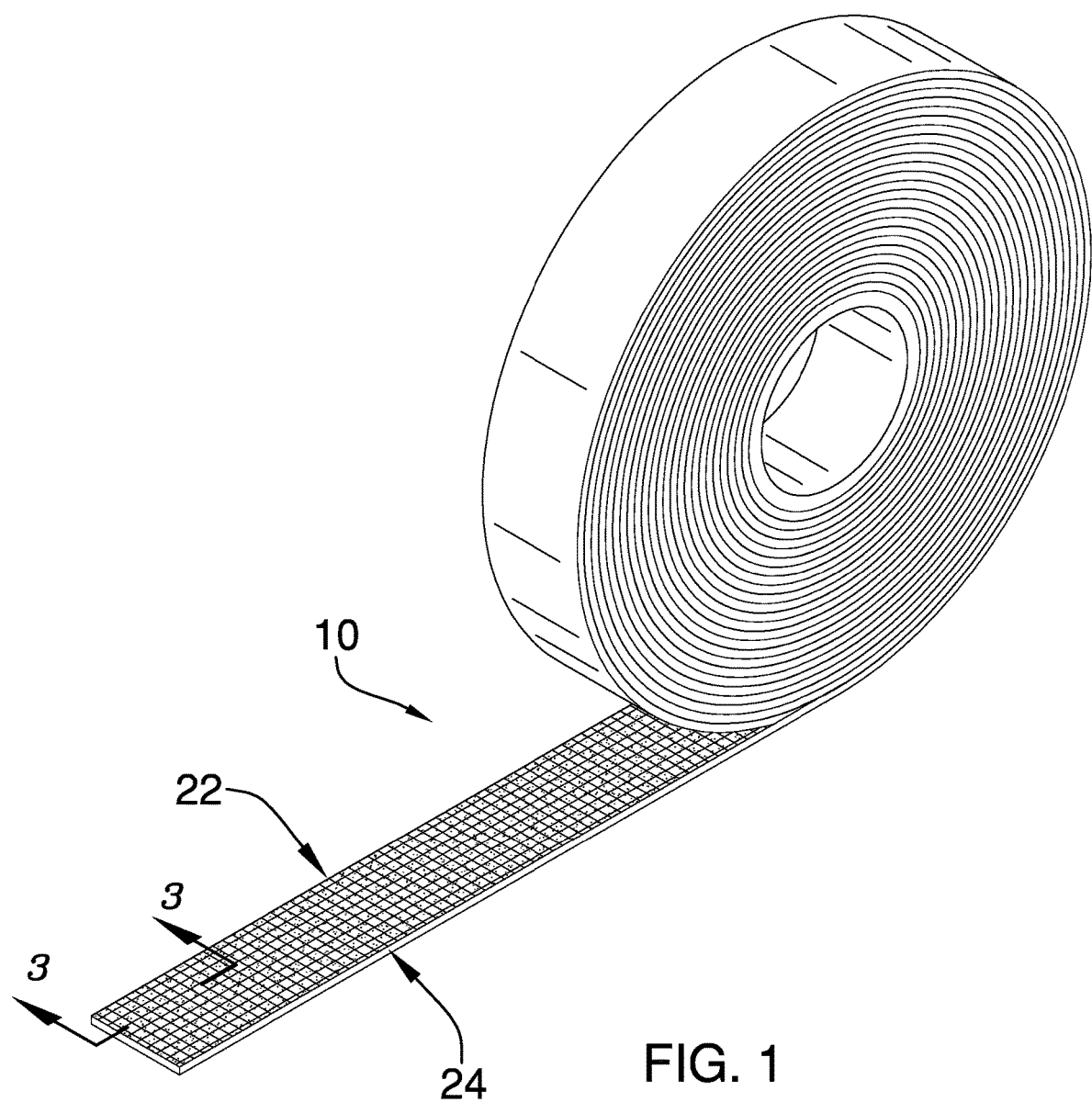
FIG. 1 is a front side view of a pesticide strip assembly according to an embodiment of the disclosure.
Figure 2:
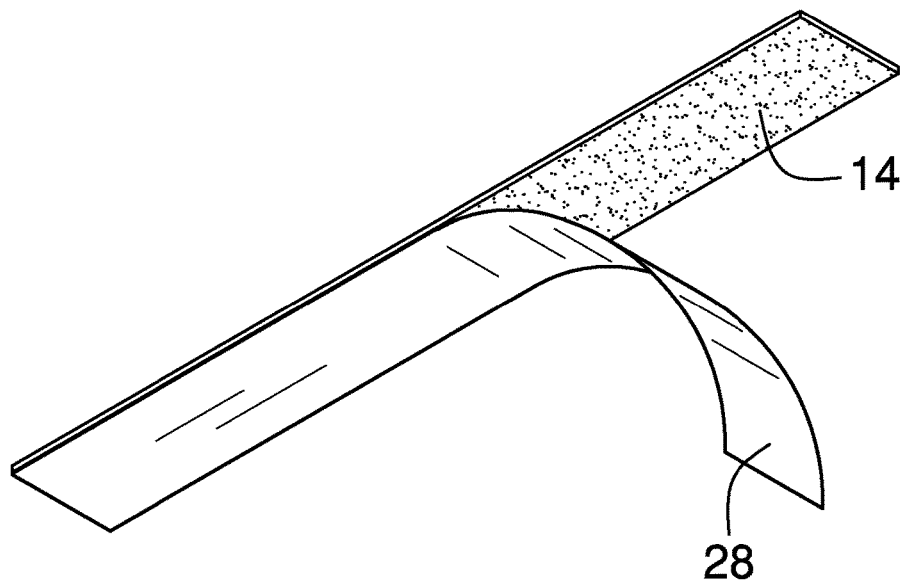
FIG. 2 is a bottom side view of an embodiment of the disclosure.
Figure 3:
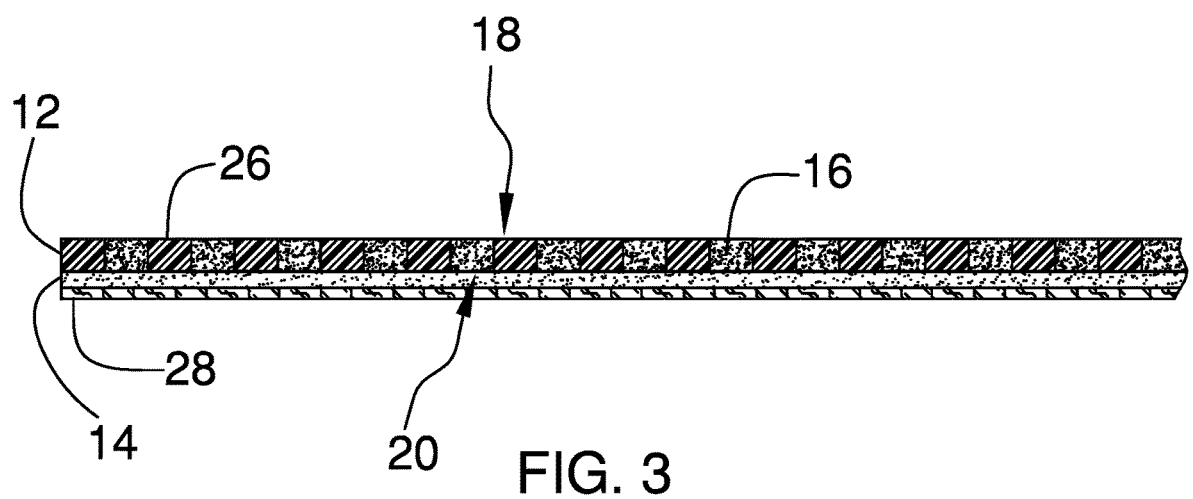
FIG. 3 is a cross-sectional view of an embodiment of the disclosure taken along the line 3-3 of FIG. 1.
Figure 4:
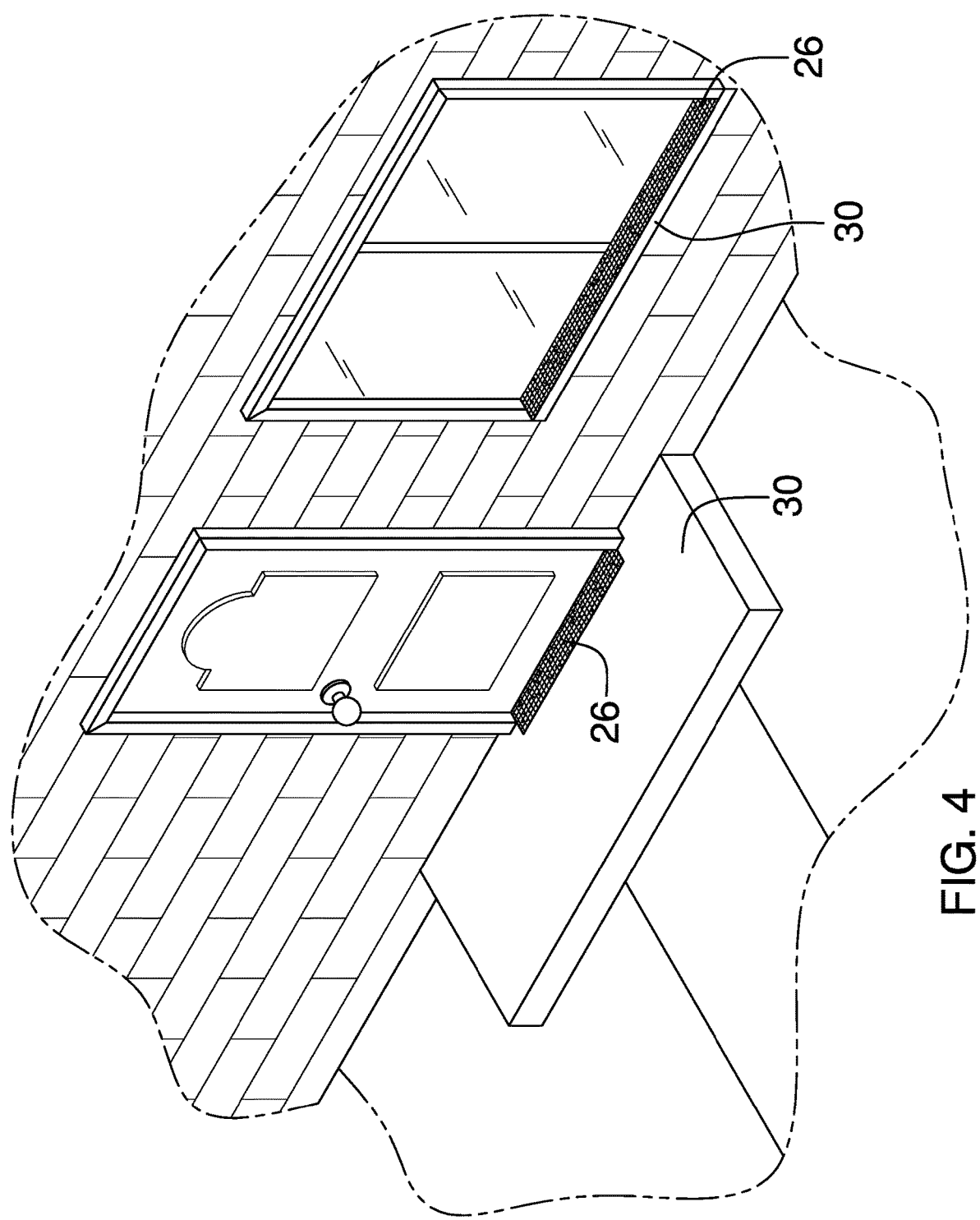
FIG. 4 is a top side view of an embodiment of the disclosure while it is in use.

With reference now to the drawings, and in particular to FIGS. 1 through 4 thereof, a new pesticide strip embodying the principles and concepts of an embodiment of the disclosure and generally designated by the reference numeral 10 will be described.

As best illustrated in FIGS. 1 through 4, the pesticide strip assembly 10 generally comprises a flexible panel 12, an adhesive layer 14 and an insecticide impregnated gel 16. The flexible panel 12 is elongated and has a top side 18, a bottom side 20, a first lateral edge 22 and a second lateral edge 24. The flexible panel 12 has a width from the first lateral edge 22 to the second lateral edge 24 which may be less than 3.0 inches. The flexible panel 12 comprises a mesh screen 26 which may be comprised of a plastic material.

The adhesive layer 14 is attached to the bottom side 20 of the flexible panel 12. The adhesive layer 14 may comprise of a pressure sensitive adhesive positioned on a flexible strip. The adhesive layer 14 covers the bottom side 20 of the flexible panel 14 and may be adhesively secured thereon. A removable cover 28 is positioned over the adhesive layer 14 such that the adhesive layer 14 is positioned between the removable cover 28 and the flexible panel 12. The removable cover 28 may be removed to expose the adhesive layer 14 opposite of the flexible panel 12.

The insecticide infused gel 16 is positioned on the flexible panel 12. The gel 16 is positioned within the mesh 28 such that openings within the mesh 28 are impregnated with the gel 16. The adhesive layer 14 may have a marker, such as coloring, to act as a warning when the insecticide 16 is no longer present or has become ineffective. One such variation may involve the adhesive layer 14 having a different color than the gel 16. Therefore, when the gel 16 has depleted the adhesive layer 14 is easily visible informing the user that the assembly 10 may need to be replaced.

In use, the assembly 10 may be used to easily apply a pesticide barrier along a desired surface 30 and monitor the levels of the pesticide. The assembly may be cut to fit the dimensions of the desired surface 30. The removable cover 28 is removed to expose the adhesive layer 14. The adhesive layer 14 is pressed against the desired surface 30. The insecticide infused gel 16 is exposed outwardly through the mesh 26 and can work conventionally as an insecticide while being monitored. The gel 16 may be depleted through use as an insecticide or through the environmental factors such as heat or rain. Once the gel 16 has been depleted the assembly 10 may be replaced. The exposed layer of gel 16 takes away the guess work involved in determining whether a pesticide needs to be replaced while the assembly 10 structure makes application and removal of pesticide easy.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A pesticide strip assembly for easy application and monitoring of pesticide comprising:

a flexible panel being elongated and having a top side, a bottom side, a first lateral edge and a second lateral edge, said flexible panel comprising a mesh screen, said mesh screen having a width from said first lateral edge to said second lateral edge being less than 3.0 inches, said mesh screen being comprised of a plastic material;

an adhesive layer being attached to said bottom side of said flexible panel, said adhesive layer comprising a pressure sensitive adhesive, said adhesive layer covering and being adhesively secured to said bottom side of said flexible panel, a removable cover being positioned over said adhesive layer such that said adhesive layer is positioned between said removable cover and said flexible panel, said removable cover being removable to expose said adhesive layer opposite of said flexible panel; and a gel infused with an insecticide being positioned on said flexible panel, said gel being positioned within said mesh screen such that openings within said mesh screen are impregnated with said gel, said gel being a color different than a color of said adhesive layer wherein said adhesive layer is visible in contrast to said gel when said gel becomes dissipated sufficiently to expose said adhesive layer.

* * * * *